US009749578B1

(12) United States Patent
Liu et al.

(10) Patent No.: US 9,749,578 B1
(45) Date of Patent: Aug. 29, 2017

(54) METHODS FOR DETERMINING FRAME RESOLUTION AND APPARATUSES USING THE SAME

(71) Applicant: VIA Alliance Semiconductor Co., Ltd., Shanghai (CN)

(72) Inventors: Bocheng Liu, Shanghai (CN); Yonghai Wu, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 15/284,315

(22) Filed: Oct. 3, 2016

(30) Foreign Application Priority Data

Sep. 9, 2016 (CN) .......................... 2016 1 0813992

(51) Int. Cl.
H04N 7/01 (2006.01)
H04N 11/20 (2006.01)

(52) U.S. Cl.
CPC ................................. H04N 7/0127 (2013.01)

(58) Field of Classification Search
CPC ........ H04N 7/0127; H04N 7/12; H04N 11/02; H04N 11/04
USPC .................... 348/441, 458, 459, 240.99, 699
See application file for complete search history.

(56) References Cited

U.S. PATENT DOCUMENTS

| 7,346,109 | B2 * | 3/2008 | Nair | H04N 7/014 |
| | | | | 348/E5.066 |
| 7,480,334 | B2 * | 1/2009 | Nair | G06T 7/20 |
| | | | | 375/240.16 |
| 8,089,557 | B2 * | 1/2012 | Kageyama | G06T 3/4053 |
| | | | | 345/698 |
| 8,264,587 | B2 * | 9/2012 | Yong | H04N 5/335 |
| | | | | 348/207.99 |
| 8,780,233 | B2 * | 7/2014 | Bekiares | H04N 5/23206 |
| | | | | 348/240.99 |
| 8,902,973 | B2 * | 12/2014 | Yang | H04N 19/126 |
| | | | | 375/240.03 |
| 9,305,362 | B1 * | 4/2016 | Szedo | H04N 5/23254 |
| 9,639,762 | B2 * | 5/2017 | Chakraborty | G06K 9/00751 |
| 2015/0326846 | A1 * | 11/2015 | Stec | H04N 21/816 |
| | | | | 348/43 |
| 2016/0191945 | A1 * | 6/2016 | Gurbuz | H04N 19/521 |
| | | | | 375/240.15 |

* cited by examiner

*Primary Examiner* — Trang U Tran
(74) *Attorney, Agent, or Firm* — McClure, Qualey & Rodack, LLP (57) ABSTRACT

The invention introduces a method for determining frame resolution, performed by a processing unit, which contains at least the following steps: obtaining a YUV video file, which contains a video stream; selecting a plurality of frame resolutions from a frame resolution table as frame resolution candidates according to the length of the video stream; repeatedly executing a loop m times, and in each iteration, obtaining at least two frames of the video stream according to one unexamined frame resolution candidate and calculating the correlation between the obtained frames, wherein m represents the quantity of frame resolution candidates; determining the best frame resolution from the frame resolution candidates according to the calculated correlations; and outputting the best frame resolution, thereby enabling a video decoder to segment the video stream into frames according to the best frame resolution and decode the segmented frames.

17 Claims, 4 Drawing Sheets

METHODS FOR DETERMINING FRAME RESOLUTION AND APPARATUSES USING THE SAME

CROSS REFERENCE TO RELATED APPLICATIONS

This application claims the benefit of China Patent Application No. 201610813992.9, filed on Sep. 9, 2016, the entirety of which is incorporated by reference herein.

BACKGROUND

Technical Field

The present invention relates to video processing, and in particular, to methods for determining frame resolution and apparatuses using the same.

Description of the Related Art

The frame resolution is the number of distinct pixels in each dimension that can be displayed. It is usually quoted as width×height, with the units in pixels: for example, "1024×768" means that the width is 1024 pixels and the height is 768 pixels. However, the YUV video stream may not contain information pertaining to its frame resolution. The YUV video stream cannot be parsed or played back by a video decoder when its frame resolution is unknown. Thus, it is desirable to have methods for determining frame resolution and apparatuses using the same to address the aforementioned drawbacks.

BRIEF SUMMARY

An embodiment of the invention introduces a method for determining frame resolution, performed by a processing unit, which contains at least the following steps: obtaining a YUV video file, which comprises a video stream; selecting a plurality of frame resolutions from a frame resolution table as frame resolution candidates according to the length of the video stream; repeatedly executing a loop m times, and in each iteration, obtaining at least two frames of the video stream according to one unexamined frame resolution candidate and calculating the correlation between the obtained frames, wherein m represents the quantity of frame resolution candidates; determining the best frame resolution from the frame resolution candidates according to the calculated correlations; and outputting the best frame resolution, thereby enabling a video decoder to segment the video stream into frames according to the best frame resolution and decode the segmented frames.

An embodiment of the invention introduces an apparatus for determining frame resolution, at least containing a processing unit. The processing unit obtains a YUV video file, which comprises a video stream, selects a plurality of frame resolutions from a frame resolution table as frame resolution candidates according to the length of the video stream, and repeatedly executes a loop m times. The processing unit, in each iteration, obtains at least two frames of the video stream according to one unexamined frame resolution candidate and calculates the correlation between the obtained frames, wherein m represents the quantity of frame resolution candidates, determines the best frame resolution from the frame resolution candidates according to the calculated correlations; and outputs the best frame resolution, thereby enabling a video decoder to segment the video stream into frames according to the best frame resolution and decode the segmented frames.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
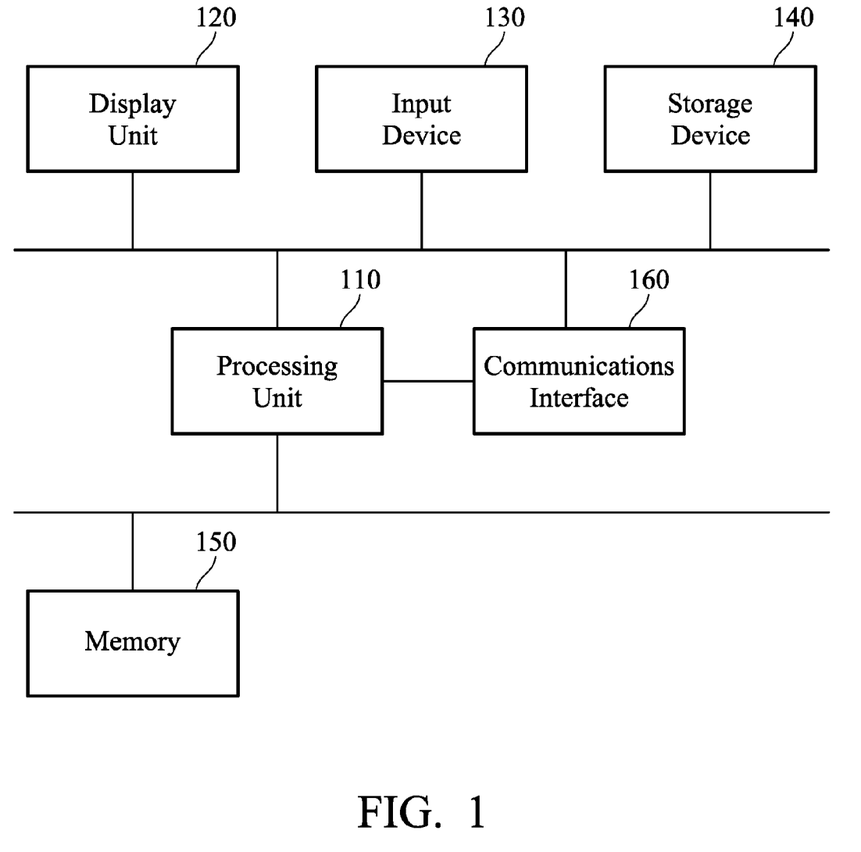
FIG. 1 is the system architecture of a computer apparatus according to an embodiment of the invention.

FIG. 1 is the system architecture of a computer apparatus according to an embodiment of the invention. The processing unit 110 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The processing unit 110 may contain an ALU (Arithmetic and Logic Unit) and a bit shifter. The ALU is responsible for performing a Boolean operation, such as AND, OR, NOT, NAND, NOR, XOR, XNOR, etc. The bit shifter is responsible for performing a bitwise shift and a bit rotation. The system architecture further includes a memory 150 for storing necessary data in execution, such as variables, data tables, data abstracts, or others, and a storage unit 140 for storing a wide range of electronic files, such as a frame resolution table, YUV video files, and others. The memory may be a DRAM (Dynamic Random Access Memory) and the storage device 140 may be a hard disk drive, an optical disk drive, a SSD (solid state disk) drive, or others. A communications interface 160 is included in the system architecture and the processing unit 110 can thereby communicate with other electronic apparatuses. The communications interface 160 may be a LAN (Local Area Network) module, a WLAN (Wireless Local Area Network) module, or others with the communications capability. The system architecture further includes one or more input devices 130 to receive user input, such as a keyboard, a mouse, a touch panel, or others. A user may press hard keys on the keyboard to input characters, control a mouse pointer on a display by operating the mouse, or control an executed application with one or more gestures made on the touch panel. The gestures include, but are not limited to, a single-click, a double-click, a single-finger drag, and a multiple finger drag. A display unit 120, such as a TFT-LCD (Thin film transistor liquid-crystal display) panel, an OLED (Organic Light-Emitting Diode) panel, or another display unit, may also be included to display input letters, alphanumeric characters and symbols, dragged paths, drawings, or screens provided by an application for a user to view.

Figure 2:
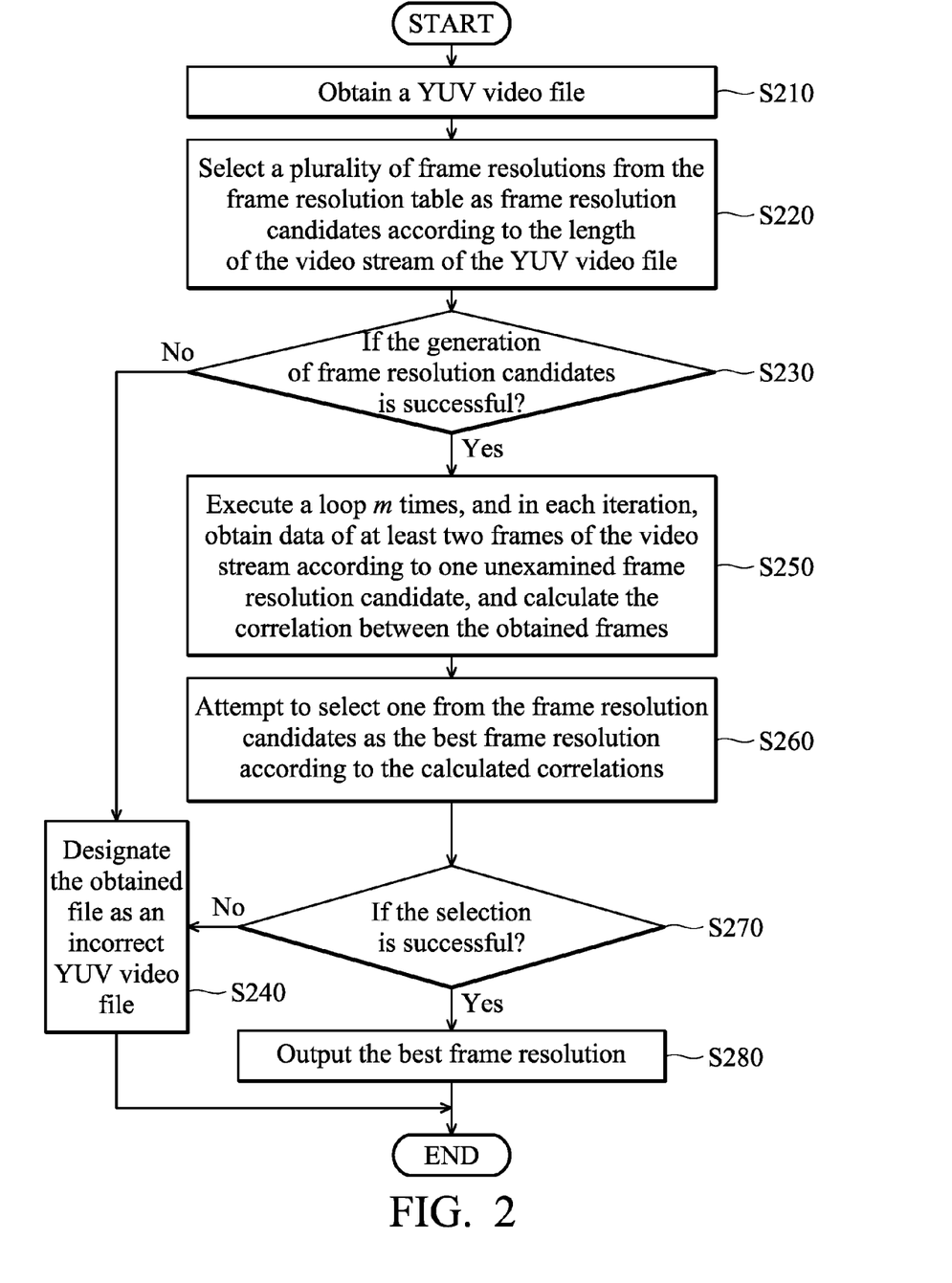
FIG. 2 is a flowchart illustrating a method for determining frame resolution according to an embodiment of the invention.

FIG. 2 is a flowchart illustrating a method for determining frame resolution according to an embodiment of the invention. The method is implemented by the processing unit 110 when loading and executing relevant program codes to determine the frame resolution of a YUV video file. Firstly, a YUV video file is obtained (step S210). The YUV video file may be read from the storage device 140 or obtained from another electronic apparatus via the communications interface 160. The YUV video file contains a header and a video stream organized in a format such as YUV444, YUV420, YUV422, etc. It should be noted that the header does not contain frame resolution information. Next, a plurality of frame resolutions are selected from the frame resolution table as frame resolution candidates according to the length of the video stream of the YUV video file (step S220). The processing unit 110 may read the frame resolution table from the storage device 140. An exemplary frame resolution table is shown in table 1:

TABLE 1

| Standard | Width (W) | Height (H) |
|---|---|---|
| SVGA | 800 | 600 |
| WSVGA | 1024 | 600 |
| XGA | 1024 | 768 |
| XGA+ | 1152 | 864 |
| WXGA | 1280 | 720 |
| WXGA | 1280 | 768 |
| WXGA | 1280 | 800 |
| SXGA | 1280 | 1024 |
| HD | 1360 | 768 |
| HD | 1366 | 768 |
| WXGA+ | 1440 | 900 |
| HD+ | 1600 | 900 |
| UXGA | 1600 | 1200 |
| WSXGA+ | 1680 | 1050 |
| FHD | 1920 | 1080 |
| WUXGA | 1920 | 1200 |
| WQHD | 2560 | 1440 |
| WQXGA | 2560 | 1600 |
| UHD | 3840 | 2160 |

The frame resolution table may be implemented in an electronic file of a file system, one or more data tables of a relational database, an electronic document of a document database, etc. The frame resolution table contains multiple records and each record stores frame resolution information for a standard, including width, height, and the like. Specifically, in step S220, it is determined whether each frame resolution of the frame resolution table is a frame resolution candidate using Equation (1):

$$L/W_j/H_j/Rt = n_j \ldots r_j \quad (1)$$

L represents the length of the video stream of the YUV video file (in bytes), $W_j$ represents the width of the $j^{th}$ frame resolution, $H_j$ represents the height of the $j^{th}$ frame resolution, Rt represents a default value associated with a particular video stream format, $n_j$ represents the calculated quotient associated with the $j^{th}$ frame resolution, and $r_j$ represents the calculated remainder associated with the $j^{th}$ frame resolution. For example, Rt may be set to 1 when the video stream format is YUV444. The variable j is an integer between 1 and k, and k represents the quantity of all frame resolutions of the frame resolution table. Rt may be set to 1 when the video stream format is YUV422. Rt may be set to 1.25 when the video stream format is YUV420. The processing unit 110 treats the frame resolutions with the calculated remainders being 0 as the frame resolution candidates. Next, the processing unit 110 determines whether the generation of the frame resolution candidates is successful (step S230). Specifically, the generation of the frame resolution candidates is unsuccessful if no frame resolution candidate can be found. When it is unsuccessful (the "No" path of step S230), the obtained file is designated as an incorrect YUV video file (step S240). In step S240, the processing unit 110 may store information indicates that this file is not correct YUV video file.

Since information carried between frames has dependency, the correlations between each two divided frames from the video stream are high if a correct frame resolution is used to perform the division. Embodiments of the invention anticipate the correct frame resolution for a YUV video file in view of the aforementioned characteristics. Specifically, the generation of frame resolution candidates is successful (the "Yes" path of step S230), a loop is repeated executed m times, and in each iteration, data of at least two frames of the video stream is obtained according to one unexamined frame resolution candidate, and the correlation between the obtained frames is calculated, where m represents the quantity of frame resolution candidates (step S250). It is attempted to select one from the frame resolution candidates as the best frame resolution according to the calculated correlations (step S260) and determined whether the selection is successful (step S270). If so (the "Yes" path of step S270), the best frame resolution is output, thereby enabling a video decoder to segment the video stream into frames according to the best frame resolution and decode the segmented frames (step S280). In step S280, the best frame resolution is written into the header or output to the video decoder. Otherwise (the "No" path of step S270), the obtained file is designated as an incorrect YUV video file (step S240). In some embodiments of each iteration of step S250, the processing unit 110 may calculate three correlations between the $p^{th}$ frame and the $(p+1)^{th}$ frame. The first correlation indicates the similar extent of Y, U and V components between this frame and the next frame and a higher value indicates a higher similarity than a lower one. The first correlation may be calculated in Equation (2):

$$R1 = \frac{\Sigma(X_i(Y) - \overline{X(Y)})(Z_i(Y) - \overline{Z(Y)}) + \Sigma(X_i(U) - \overline{X(U)})(Z_i(U) - \overline{Z(U)}) + \Sigma(X_i(V) - \overline{X(V)})(Z_i(V) - \overline{Z(V)})}{\sqrt{\Sigma(X_i(Y) - \overline{X(Y)})^2 \Sigma(Z_i(Y) - \overline{Z(Y)})^2 \Sigma(X_i(U) - \overline{X(U)})^2 \Sigma(Z_i(U) - \overline{Z(U)})^2 \Sigma(X_i(V) - \overline{X(V)})^2 \Sigma(Z_i(V) - \overline{Z(V)})^2}} \quad (2)$$

R1 represents the first correlation, $X_i(Y)$ represents the $i^{th}$ Y component of this frame, $X_i(U)$ represents the $i^{th}$ U component of this frame, $X_i(V)$ represents the $i^{th}$ V component of this frame, $Z_i(Y)$ represents the $i^{th}$ Y component of the next frame, $Z_i(U)$ represents the $i^{th}$ U component of the next frame, $Z_i(V)$ represents the $i^{th}$ V component of the next frame, $\overline{X(Y)}$ represents the average of all Y components of this frame, $\overline{X(U)}$ represents the average of all U components of this frame, $\overline{X(V)}$ represents the average of all V components of this frame, $\overline{Z(Y)}$ represents the average of all Y components of the next frame, $\overline{Z(U)}$ represents the average of all U components of the next frame, and $\overline{Z(V)}$ represents the average of all V components of the next frame. The second correlation indicates the similar extent of Y, U and V components between odd rows of this frame and even rows of the next frame and a higher value indicates a higher similarity than a lower one. The second correlation may be calculated in Equation (3):

$$R2 = \frac{\Sigma(X_i(Y)-\overline{X(Y)})(Z_i(Y)-\overline{Z(Y)}) + \Sigma(X_i(U)-\overline{X(U)})(Z_i(U)-\overline{Z(U)}) + \Sigma(X_i(V)-\overline{X(V)})(Z_i(V)-\overline{Z(V)})}{\sqrt{\Sigma(X_i(Y)-\overline{X(Y)})^2 \Sigma(Z_i(Y)-\overline{Z(Y)})^2 \Sigma(X_i(U)-\overline{X(U)})^2 \Sigma(Z_i(U)-\overline{Z(U)})^2 \Sigma(X_i(V)-\overline{X(V)})^2 \Sigma(Z_i(V)-\overline{Z(V)})^2}} \quad (3)$$

R2 represents the second correlation, $X_i(Y)$ represents the $i^{th}$ Y component of even rows of this frame, $X_i(U)$ represents the $i^{th}$ U component of even rows of this frame, $X_i(V)$ represents the $i^{th}$ V component of even rows of this frame, $Z_i(Y)$ represents the $i^{th}$ Y component of odd rows of the next frame, $Z_i(U)$ represents the $i^{th}$ U component of odd rows of the next frame, $Z_i(V)$ represents the $i^{th}$ V component of odd rows of the next frame, $\overline{X(Y)}$ represents the average of all Y components of even rows of this frame, $\overline{X(U)}$ represents the average of all U components of even rows of this frame, $\overline{X(V)}$ represents the average of all V components of even rows of this frame, $\overline{Z(Y)}$ represents the average of all Y components of odd rows of the next frame, $\overline{Z(U)}$ represents the average of all U components of odd rows of the next frame, and $\overline{Z(V)}$ represents the average of all V components of odd rows of the next frame. The third correlation indicates the similar extent of Y components between odd columns of this frame and even columns of the next frame and a higher value indicates a higher similarity than a lower one. The third correlation may be calculated in Equation (4):

$$R3 = \frac{\Sigma(X_i(Y)-\overline{X(Y)})(Z_i(Y)-\overline{Z(Y)})}{\sqrt{\Sigma(X_i(Y)-\overline{X(Y)})^2 \Sigma(Z_i(Y)-\overline{Z(Y)})^2}} \quad (4)$$

R3 represents the third correlation, $X_i(Y)$ represents the $i^{th}$ Y component of even columns of this frame, $Z_i(Y)$ represents the $i^{th}$ Y component of odd columns of the next frame, $\overline{X(Y)}$ represents the average of all Y components of even columns of this frame, and $\overline{Z(Y)}$ represents the average of all Y components of odd columns of the next frame. In step S260, one frame resolution candidate with the highest correlations R1 to R3 between the $p^{th}$ frame and the $(p+1)^{th}$ frame, each of which is greater than a threshold (e.g. 0.4), is selected as the best frame resolution. That is, the correlation R1 between the $p^{th}$ frame and the $(p+1)^{th}$ frame for the best frame resolution is higher than that for the other frame resolution candidates and greater than the threshold. The correlation R2 between the $p^{th}$ frame and the $(p+1)^{th}$ frame for the best frame resolution is higher than that for the other frame resolution candidates and greater than the threshold. The correlation R3 between the $p^{th}$ frame and the $(p+1)^{th}$ frame for the best frame resolution is higher than that for the other frame resolution candidates and greater than the threshold. In step S270, it is determined that the selection is unsuccessful when no frame resolution candidate is found to have the highest correlations R1 to R3 between the $p^{th}$ frame and the $(p+1)^{th}$ frame, each of which is greater than the threshold.

In some embodiments of each iteration of step S250, the processing unit 110 may calculate the correlations R3 between the $p^{th}$ frame and the $(p+1)^{th}$ frame, the $(p+1)^{th}$ frame and the $(p+2)^{th}$ frame, and the $(p+2)^{th}$ frame and the $(p+3)^{th}$ frame. In step S260, one frame resolution candidate with the highest correlations R3 between the $p^{th}$ frame and the $(p+1)^{th}$ frame, the $(p+1)^{th}$ frame and the $(p+2)^{th}$ frame, and the $(p+2)^{th}$ frame and the $(p+3)^{th}$ frame is determined as the best frame resolution. That is, the correlation R3 between the $p^{th}$ frame and the $(p+1)^{th}$ frame for the best frame resolution is higher than that for the other frame resolution candidates. The correlation R3 between the $(p+1)^{th}$ frame and the $(p+2)^{th}$ frame for the best frame resolution is higher than that for the other frame resolution candidates. The correlation R3 between the $(p+2)^{th}$ frame and the $(p+3)^{th}$ frame for the best frame resolution is higher than that for the other frame resolution candidates. In step S270, it is determined that the selection is unsuccessful when no frame resolution candidate is found to have the highest correlations R3 between the $p^{th}$ frame and the $(p+1)^{th}$ frame, the $(p+1)^{th}$ frame and the $(p+2)^{th}$ frame, and the $(p+2)^{th}$ frame and the $(p+3)^{th}$ frame.

Figure 3A:
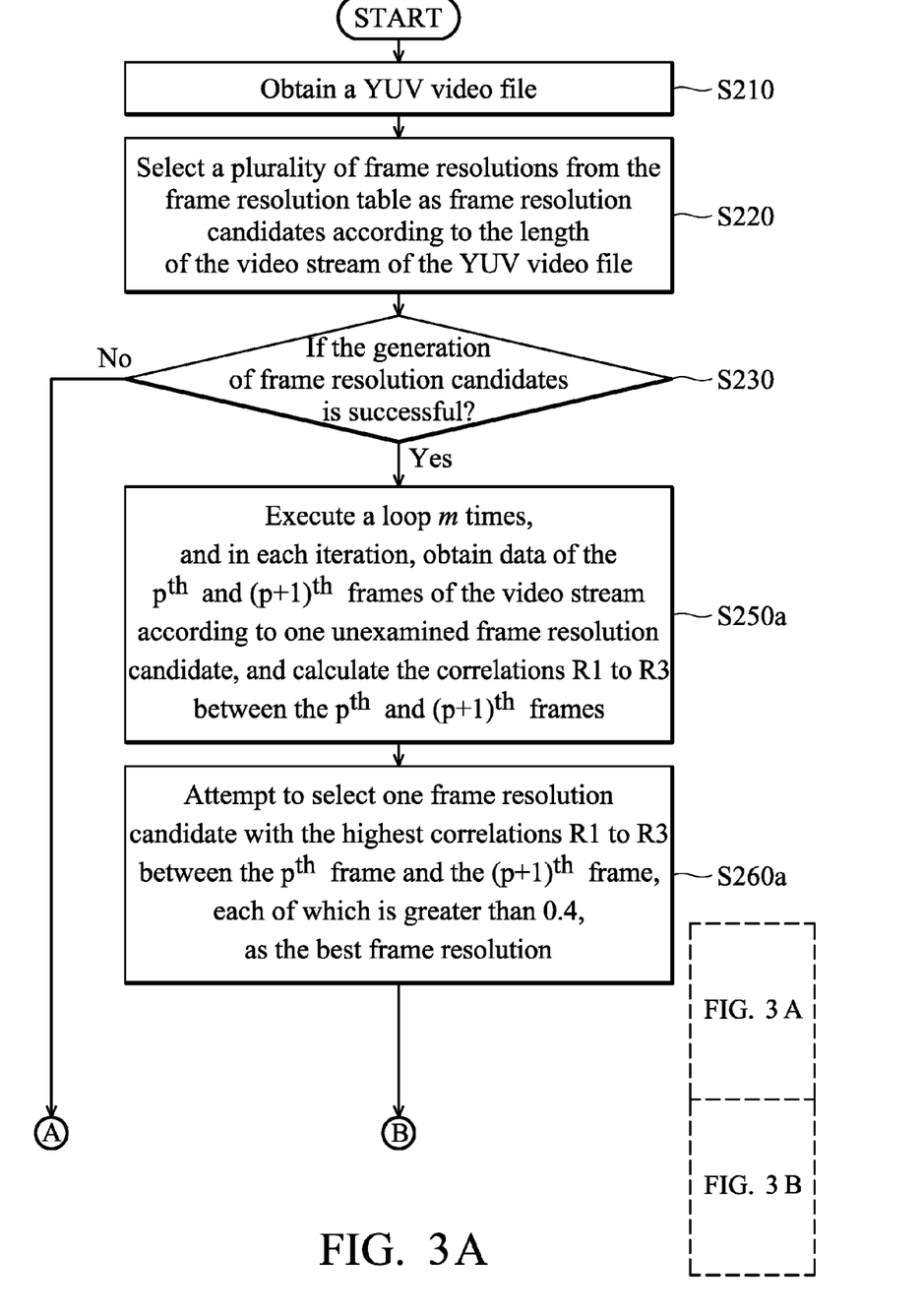
FIGS. 3A and 3B are flowcharts illustrating a method for determining frame resolution according to an embodiment of the invention.
Figure 3B:
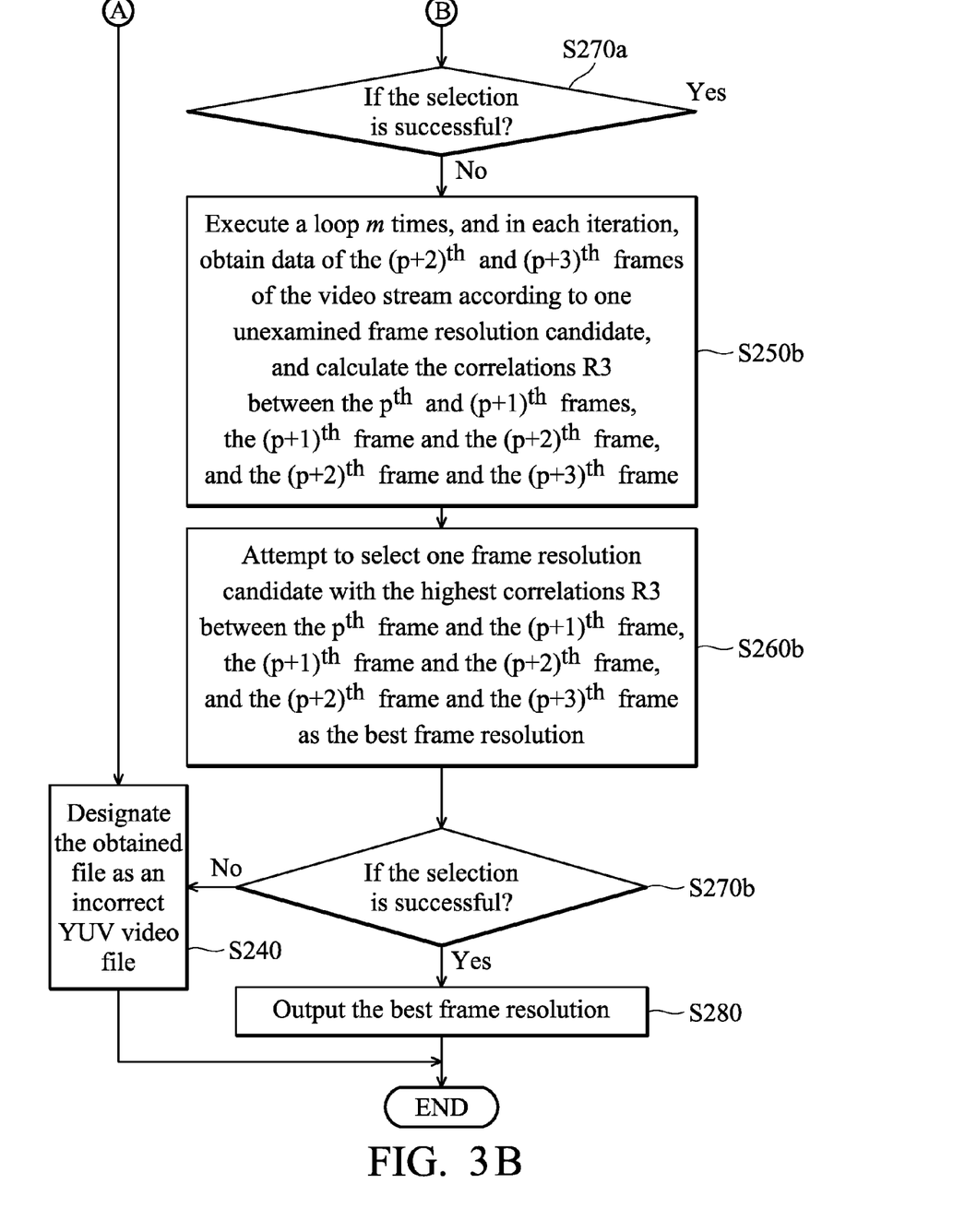

In some embodiments, the calculations of correlations (step S250) and the selection for the best frame resolution (step S260) may be divided into two phases. FIGS. 3A and 3B are flowcharts illustrating a method for determining frame resolution according to an embodiment of the invention. Specifically, the processing unit 110 may repeatedly execute a loop m times, and in each iteration, data of the $p^{th}$ frame and the $(p+1)^{th}$ frame of the video stream is obtained according to one unexamined frame resolution candidate, and correlations R1 to R3 between the $p^{th}$ frame and the $(p+1)^{th}$ frame are calculated, where m represents the quantity of frame resolution candidates (step S250a). Next, the processing unit 110 attempts to select one frame resolution candidate with the highest correlations R1 to R3 between the $p^{th}$ frame and the $(p+1)^{th}$ frame, each of which is greater than 0.4, as the best frame resolution (step S260a). If the selection is successful (the "Yes" path of step S270a), the process proceeds to step S280. If the selection is not successful (the "No" path of step S270a), the processing unit 110 may repeatedly execute a loop m times, and in each iteration, data of the $(p+2)^{th}$ frame and the $(p+3)^{th}$ frame of the video stream is obtained according to one unexamined frame resolution candidate, and correlations R3 between the $(p+1)^{th}$ frame and the $(p+2)^{th}$ frame, and the $(p+2)^{th}$ frame and the (p+3)$^{th}$ frame are calculated (step S250b). Next, the processing unit 110 attempts to select one frame resolution candidate with the highest correlations R3 between the p$^{th}$ frame and the (p+1)$^{th}$ frame, the (p+1)$^{th}$ frame and the (p+2)$^{th}$ frame, and the (p+2)$^{th}$ frame and the (p+3)$^{th}$ frame as the best frame resolution (step S260b). If the selection is successful (the "Yes" path of step S270b), the process proceeds to step S280. If the selection is not successful (the "No" path of step S270b), the process proceeds to step S240.

In some implementations, the method may divide video stream into frames according every frame resolution of the frame resolution table and determine whether every divided result is correct using an algorithm. Embodiments of the invention employ a calculation in step S220 to remove most of the improper frame resolutions in the frame resolution table from further consideration, so as to improve calculation efficiency.

Although the embodiment has been described as having specific elements in FIG. 1, it should be noted that additional elements may be included to achieve better performance without departing from the spirit of the invention. While the process flows described in FIGS. 2 and 3 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for determining frame resolution, performed by a processing unit, comprising:
   obtaining a YUV video file, which comprises a video stream;
   selecting a plurality of frame resolutions from a frame resolution table as frame resolution candidates according to length of the video stream;
   repeatedly executing a loop m times, and in each iteration, obtaining at least two frames of the video stream according to one unexamined frame resolution candidate and calculating a correlation between the obtained frames, wherein m represents quantity of the frame resolution candidates;
   determining best frame resolution from the frame resolution candidates according to the calculated correlations; and
   outputting the best frame resolution, thereby enabling a video decoder to segment the video stream into frames according to the best frame resolution and decode the segmented frame,
   wherein the step for selecting a plurality of frame resolutions from a frame resolution table as frame resolution candidates according to length of the video stream comprises:
   calculating the j$^{th}$ frame resolution of the frame resolution table using an Equation, wherein j is an integer between 1 to k, and k represents quantity of all frame resolutions of the frame resolution table:

$$L/W_j/H_j/Rt=n_j \ldots r_j$$

L represents the length of the video stream of the YUV video file, $W_j$ represents a width of the j$^{th}$ frame resolution, $H_j$ represents a height of the j$^{th}$ frame resolution, Rt represents a default value associated with a particular video stream format, $n_j$ represents a quotient associated with the j$^{th}$ frame resolution, and $r_j$ represents a remainder associated with the j$^{th}$ frame resolution; and
treating the frame resolutions with the remainder being 0 as the frame resolution candidates.

2. The method of claim 1, wherein the YUV video file comprises a header and the header does not contain frame resolution information.

3. The method of claim 2, wherein the step for outputting the best frame resolution comprises:
   writing the best frame resolution into the header or outputting the best frame resolution to the video decoder.

4. The method of claim 1, wherein the step for repeatedly executing a loop m times comprises:
   in each iteration, obtaining data of a p$^{th}$ frame and a (p+1)$^{th}$ frame from the video stream according to one unexamined frame resolution candidate; and
   calculating a first correlation, a second correlation and a third correlation between the p$^{th}$ frame and the (p+1)$^{th}$ frame, and
   wherein the step for determining the best frame resolution from the frame resolution candidates according to the calculated correlations comprises:
   selecting one frame resolution candidate with the highest first, second and third correlations between the p$^{th}$ frame and the (p+1)$^{th}$ frame, each of which is greater than a threshold, as the best frame resolution.

5. The method of claim 4, wherein the first correlation indicates the similar extent of Y, U and V components between the p$^{th}$ frame and the (p+1)$^{th}$ frame, the second correlation indicates the similar extent of Y, U and V components between odd rows of the p$^{th}$ frame and even rows of the (p+1)$^{th}$ frame, and the third correlation indicates the similar extent of Y components between odd columns of the p$^{th}$ frame and even columns of the (p+1)$^{th}$ frame.

6. The method of claim 5, wherein the first correlation is calculated in an Equation:

$$R1 = \frac{\begin{array}{l}\Sigma(X_i(Y)-\overline{X(Y)})(Z_i(Y)-\overline{Z(Y)})+\\ \Sigma(X_i(U)-\overline{X(U)})(Z_i(U)-\overline{Z(U)})+\\ \Sigma(X_i(V)-\overline{X(V)})(Z_i(V)-\overline{Z(V)})\end{array}}{\sqrt{\begin{array}{l}\Sigma(X_i(Y)-\overline{X(Y)})^2\Sigma(Z_i(Y)-\overline{Z(Y)})^2\Sigma(X_i(U)-\overline{X(U)})^2\\ \Sigma(Z_i(U)-\overline{Z(U)})^2\Sigma(X_i(V)-\overline{X(V)})^2\Sigma(Z_i(V)-\overline{Z(V)})^2\end{array}}}$$

R1 represents the first correlation, $X_i(Y)$ represents an i$^{th}$ Y component of the p$^{th}$ frame, $X_i(U)$ represents an i$^{th}$ U component of the p$^{th}$ frame, $X_i(V)$ represents an i$^{th}$ V component of the p$^{th}$ frame, $Z_i(Y)$ represents an i$^{th}$ Y component of the (p+1)$^{th}$ frame, $Z_i(U)$ represents an i$^{th}$ U component of the (p+1)$^{th}$ frame, $Z_i(V)$ represents an i$^{th}$ V component of the (p+1)$^{th}$ frame, $\overline{X(Y)}$ represents an average of all Y components of the p$^{th}$ frame, $\overline{X(U)}$ represents an average of all U components of the p$^{th}$ frame, $\overline{X(V)}$ represents an average of all V components of the p$^{th}$ frame, $\overline{Z(Y)}$ represents an average of all Y components of the (p+1)$^{th}$ frame, $\overline{Z(U)}$ represents an average of all U components of the (p+1)$^{th}$ IP frame, and $\overline{Z(V)}$ represents an average of all V components of the (p+1)$^{th}$ frame, the second correlation is calculated in an Equation:

$$R2 = \frac{\begin{array}{c}\Sigma(X_i(Y) - \overline{X(Y)})(Z_i(Y) - \overline{Z(Y)}) + \\ \Sigma(X_i(U) - \overline{X(U)})(Z_i(U) - \overline{Z(U)}) + \\ \Sigma(X_i(V) - \overline{X(V)})(Z_i(V) - \overline{Z(V)})\end{array}}{\sqrt{\begin{array}{c}\Sigma(X_i(Y) - \overline{X(Y)})^2 \Sigma(Z_i(Y) - \overline{Z(Y)})^2 \Sigma(X_i(U) - \overline{X(U)})^2 \\ \Sigma(Z_i(U) - \overline{Z(U)})^2 \Sigma(X_i(V) - \overline{X(V)})^2 \Sigma(Z_i(V) - \overline{Z(V)})^2\end{array}}}$$

R2 represents the second correlation, $X_i(Y)$ represents an $i^{th}$ Y component of even rows of the p$^{th}$ frame, $X_i(U)$ represents an $i^{th}$ U component of even rows of the p$^{th}$ frame, $X_i(V)$ represents an $i^{th}$ V component of even rows of the p$^{th}$ frame, $Z_i(Y)$ represents an $i^{th}$ Y component of odd rows of the (p+1)$^{th}$ frame, $Z_i(U)$ represents an $i^{th}$ U component of odd rows of the (p+1)$^{th}$ frame, $Z_i(V)$ represents an $i^{th}$ V component of odd rows of the (p+1)$^{th}$ frame, $\overline{X(Y)}$ represents an average of all Y components of even rows of the p$^{th}$ frame, $\overline{X(U)}$ represents an average of all U components of even rows of the p$^{th}$ frame, $\overline{X(V)}$ represents an average of all V components of even rows of the p$^{th}$ frame, $\overline{Z(Y)}$ represents an average of all Y components of odd rows of the (p+1)$^{th}$ frame, $\overline{Z(U)}$ represents an average of all U components of odd rows of the (p+1)$^{th}$ frame, and $\overline{Z(V)}$ represents an average of all V components of odd rows of the (p+1)$^{th}$ frame, and the third correlation is calculated in an Equation:

$$R3 = \frac{\Sigma(X_i(Y) - \overline{X(Y)})(Z_i(Y) - \overline{Z(Y)})}{\sqrt{\Sigma(X_i(Y) - \overline{X(Y)})^2 \Sigma(Z_i(Y) - \overline{Z(Y)})^2}}$$

R3 represents the third correlation, $X_i(Y)$ represents an $i^{th}$ Y component of even columns of the p$^{th}$ frame, $Z_i(Y)$ represents an $i^{th}$ Y component of odd columns of the (p+1)$^{th}$ frame, $\overline{X(Y)}$ represents an average of all Y components of even columns of the p$^{th}$ frame, and $\overline{Z(Y)}$ represents an average of all Y components of odd columns of the (p+1)$^{th}$ IP frame.

7. The method of claim 1, wherein the step for repeatedly executing a loop m times comprises:

in each iteration, obtaining data of a p$^{th}$ frame, a (p+1)$^{th}$ frame, a (p+2)$^{th}$ frame and a (p+3)$^{th}$ frame from the video stream according to one unexamined frame resolution candidate; and calculating a third correlation between the p$^{th}$ frame and the (p+1)$^{th}$ frame, a third correlation between (p+1)$^{th}$ frame and the (p+2)$^{th}$ frame, and a third correlation between (p+2)$^{th}$ frame and the (p+3)$^{th}$ frame, and wherein the step for determining the best frame resolution from the frame resolution candidates according to the calculated correlations comprises:

selecting one frame resolution candidate with the highest third correlation between the p$^{th}$ frame and the (p+1)$^{th}$ frame, the highest third correlation between (p+1)$^{th}$ frame and the (p+2)$^{th}$ frame, and the highest third correlation between (p+2)$^{th}$ frame and the (p+3)$^{th}$ frame as the best frame resolution.

8. The method of claim 7, wherein the third correlation between the p$^{th}$ frame and the (p+1)$^{th}$ frame indicates the similar extent of Y components between odd columns of the p$^{th}$ frame and even columns of the (p+1)$^{th}$ frame, the third correlation between the (p+1)$^{th}$ frame and the (p+2)$^{th}$ frame indicates the similar extent of Y components between odd columns of the (p+1)$^{th}$ frame and even columns of the (p+2)$^{th}$ frame, and the third correlation between the (p+2)$^{th}$ frame and the (p+3)$^{th}$ frame indicates the similar extent of Y components between odd columns of the (p+2)$^{th}$ frame and even columns of the (p+3)$^{th}$ frame.

9. An apparatus for determining frame resolution, comprising:

a processing unit and associated memory, obtaining a YUV video file, which comprises a video stream; selecting a plurality of frame resolutions from a frame resolution table as frame resolution candidates according to length of the video stream; repeatedly executing a loop m times, and in each iteration, obtaining at least two frames of the video stream according to one unexamined frame resolution candidate and calculating a correlation between the obtained frames, wherein m represents quantity of frame resolution candidates; determining the best frame resolution from the frame resolution candidates according to the calculated correlations; and outputting the best frame resolution, thereby enabling a video decoder to segment the video stream into frames according to the best frame resolution and decode the segmented frame, wherein the operation of selecting a plurality of frame resolutions from a frame resolution table as frame resolution candidates according to length of the video stream comprises:

calculating the j$^{th}$ frame resolution of the frame resolution table using an Equation, wherein j is an integer between 1 to k, and k represents quantity of all frame resolutions of the frame resolution table:

$L/W_j/H_j/Rt = n_j \ldots r_j$

L represents the length of the video stream of the YUV video file, $W_j$ represents a width of the j$^{th}$ frame resolution, $H_j$ represents a height of the j$^{th}$ frame resolution, Rt represents a default value associated with a particular video stream format, $n_j$ represents a quotient associated with the j$^{th}$ frame resolution, and $r_j$ represents a remainder associated with the j$^{th}$ frame resolution; and treating the frame resolutions with the remainder being 0 as the frame resolution candidates.

10. The apparatus of claim 9, comprising:

a storage device, storing the YUV video file and the frame resolution table, wherein the processing unit reads the YUV video file and the frame resolution table from the storage device.

11. The apparatus of claim 9, comprising:

a storage device, storing the frame resolution table; and a communications interface, wherein the processing unit reads the frame resolution table from the storage device and obtains the YUV video file from an electronic apparatus via the communications interface.

12. The apparatus of claim 9, wherein the YUV video file comprises a header and the header does not contain frame resolution information.

13. The apparatus of claim 12, wherein the processing unit writes the best frame resolution into the header or outputs the best frame resolution to the video decoder.

14. The apparatus of claim 9, wherein the processing unit, in each iteration, obtains data of a $p^{th}$ frame and a $(p+1)^{th}$ frame from the video stream according to one unexamined frame resolution candidate; calculates a first correlation, a second correlation and a third correlation between the $p^{th}$ frame and the $(p+1)^{th}$ frame; and selects one frame resolution candidate with the highest first, second and third correlations between the $p^{th}$ frame and the $(p+1)^{th}$ frame, each of which is greater than a threshold, as the best frame resolution.

15. The apparatus of claim 14, wherein the first correlation indicates the similar extent of Y, U and V components between the $p^{th}$ frame and the $(p+1)^{th}$ frame, the second the $p^{th}$ frame and even rows of the $(p+1)^{th}$ frame, and the third correlation indicates the similar extent of Y components between odd columns of the $p^{th}$ frame and even columns of the $(p+1)^{th}$ frame.

16. The apparatus of claim 9, wherein the processing unit, in each iteration, obtains data of a $p^{th}$ frame, a $(p+1)^{th}$ frame, a $(p+2)^{th}$ frame and a $(p+3)^{th}$ frame from the video stream according to one unexamined frame resolution candidate; calculates a third correlation between the $p^{th}$ frame and the $(p+1)^{th}$ frame, a third correlation between $(p+1)^{th}$ frame and the $(p+2)^{th}$ frame, and a third correlation between $(p+2)^{th}$ frame and the $(p+3)^{th}$ frame; and selects one frame resolution candidate with the highest third correlation between the $p^{th}$ frame and the $(p+1)^{th}$ frame, the highest third correlation between $(p+1)^{th}$ frame and the $(p+2)^{th}$ frame, and the highest third correlation between $(p+2)^{th}$ frame and the $(p+3)^{th}$ frame as the best frame resolution.

17. The apparatus of claim 16, wherein the third correlation between the $p^{th}$ frame and the $(p+1)^{th}$ frame indicates the similar extent of Y components between odd columns of the $p^{th}$ frame and even columns of the $(p+1)^{th}$ frame, the third correlation between the $(p+1)^{th}$ frame and the $(p+2)^{th}$ frame indicates the similar extent of Y components between odd columns of the $(p+1)^{th}$ frame and even columns of the $(p+2)^{th}$ frame, and the third correlation between the $(p+2)^{th}$ frame and the $(p+3)^{th}$ frame indicates the similar extent of Y components between odd columns of the $(p+2)^{th}$ frame and even columns of the $(p+3)^{th}$ frame.

* * * * *